US010362269B2

(12) United States Patent
Solovey et al.

(10) Patent No.: US 10,362,269 B2
(45) Date of Patent: Jul. 23, 2019

(54) SYSTEMS AND METHODS FOR DETERMINING ONE OR MORE ACTIVE SPEAKERS DURING AN AUDIO OR VIDEO CONFERENCE SESSION

(71) Applicant: RingCentral, Inc., Belmont, CA (US)

(72) Inventors: Dmitriy Solovey, San Jose, VA (US); Aleksei Petrov, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 15/403,401

(22) Filed: Jan. 11, 2017

(65) Prior Publication Data
US 2018/0196634 A1 Jul. 12, 2018

(51) Int. Cl.
*H04M 11/08* (2006.01)
*H04N 7/15* (2006.01)
*H04M 3/56* (2006.01)
*G06F 3/16* (2006.01)

(52) U.S. Cl.
CPC .............. *H04N 7/15* (2013.01); *G06F 3/167* (2013.01); *H04M 3/569* (2013.01)

(58) Field of Classification Search
CPC ........................... H04L 65/00; H04L 65/1066
USPC ........................................................ 704/275
See application file for complete search history.

(56) References Cited

U.S. PATENT DOCUMENTS

| 5,774,791 | A | * | 6/1998 | Strohallen | ............ | H04B 5/0006 |
| | | | | | | 455/41.1 |
| 6,487,535 | B1 | * | 11/2002 | Smyth | ................. | G10L 19/0208 |
| | | | | | | 704/201 |
| 6,501,739 | B1 | * | 12/2002 | Cohen | ..................... | H04L 29/06 |
| | | | | | | 370/260 |
| 6,894,715 | B2 | | 5/2005 | Henrikson | | |
| 7,283,585 | B2 | * | 10/2007 | LeBlanc | ............. | G10L 19/0208 |
| | | | | | | 375/222 |
| 7,443,812 | B2 | * | 10/2008 | Tackin | .................... | G10L 25/90 |
| | | | | | | 370/286 |
| 8,320,265 | B2 | * | 11/2012 | Zhan | ..................... | G10L 19/005 |
| | | | | | | 370/252 |

(Continued)

*Primary Examiner* — Michael N Opsasnick
(74) *Attorney, Agent, or Firm* — Finnegan, Henderson, Farabow, Garrett & Dunner, LLP

(57) ABSTRACT

The present disclosure relates to systems and methods for automatically determining the active users in an audio or video conference session including a plurality of users. In one implementation, the system may include a memory storing instructions and a processor configured to execute the instructions to receive packets from a device associated with each of a plurality of users, update a loudest level associated with each user if the received packet from the user reflects a communication louder than all of the previously received packets from the user, calculate a loudness ratio associated with each user based on the loudest level associated with each user and a corresponding time-decaying average, sort the plurality of users by a loudness score associated with each user, and mute audio or hide video received from a subset of the plurality of users in the conference session. The loudness score may be based on the loudness ratio associated with each user, and the muted or hidden subset may include one or more users for which the associated loudness score is lowest according to the sorting.

18 Claims, 10 Drawing Sheets

(56) References Cited

U.S. PATENT DOCUMENTS

| | | | | |
|---|---|---|---|---|
| 8,965,770 B2* | 2/2015 | Petrushin | ................ | G10L 17/26 |
| | | | | 704/270 |
| 2003/0112947 A1* | 6/2003 | Cohen | .................... | H04L 29/06 |
| | | | | 379/202.01 |
| 2005/0031097 A1* | 2/2005 | Rabenko | .................. | H04B 3/23 |
| | | | | 379/93.31 |
| 2009/0052642 A1* | 2/2009 | Tackin | ................. | H04M 7/006 |
| | | | | 379/93.05 |

* cited by examiner

SYSTEMS AND METHODS FOR DETERMINING ONE OR MORE ACTIVE SPEAKERS DURING AN AUDIO OR VIDEO CONFERENCE SESSION

TECHNICAL FIELD

The present disclosure relates generally to the field of audio or video conferencing. More specifically, and without limitation, this disclosure relates to systems and methods for automatically determining the active speakers amongst a plurality of users in a conference session.

BACKGROUND

In an audio conference session, it is sometimes distracting for a user to hear audio and/or see video from all other users, including non-active ones. Similarly, in a video conference session, it sometimes impractical for each user to hear audio and/or see video from all other users, including non-active ones. However, muting and/or hiding non-active users require an accurate determination of which users are active.

Moreover, background noises and differences between the hardware and/or software used by various users may complicate determining which users are active. As a result, there is a need for a system that determines which users are active without relying on the stated decibel level of audio received from each user.

SUMMARY

In view of the foregoing, embodiments of the present disclosure provide a system and method for automatically determining the active users in a conference session including a plurality of users. In accordance with some embodiments, a time-decaying average is defined for each user and is used to determine which users are active. Due to its use of relative volume levels, the time-decaying average accounts for background noise and for differences between the hardware and/or software used by various users.

According to an example embodiment of the present disclosure, a system for automatically determining the active users in an audio or video conference session including a plurality of users is described. The system may include a memory storing instructions and a processor configured to execute the instructions to: receive audio packets from each of the plurality of users, update a loudest level associated with each user if the received audio packet from the user is louder than all of the previously received audio packets from the user, update the time-decaying average associated with each user based on the loudest level associated with each user, calculate a loudness ratio associated with each user based on the time-decaying average and the loudest level associated with each user, update a loudness score associated with each user based on the loudness ratio associated with each user, and sort the plurality of users by the loudness score associated with each user.

According to another example embodiment of the present disclosure, a method for automatically determining the active users in an audio or video conference session including a plurality of users is described. The method may include receiving audio packets from each of the plurality of users, updating a loudest level associated with each user if the received audio packet from the user is louder than all of the previously received audio packets from the user, updating the time-decaying average associated with each user based on the loudest level associated with each user, calculating a loudness ratio associated with each user based on the time-decaying average and the loudest level associated with each user, updating a loudness score associated with each user based on the loudness ratio associated with each user, and sorting the plurality of users by the loudness score associated with each user.

It is to be understood that the foregoing general description and the following detailed description are example and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles disclosed herein. In the drawings:

FIG. 6b is a graphical representation of an example calculation of the time score for the example user of FIG. 6a.

DETAILED DESCRIPTION

Figure 1:
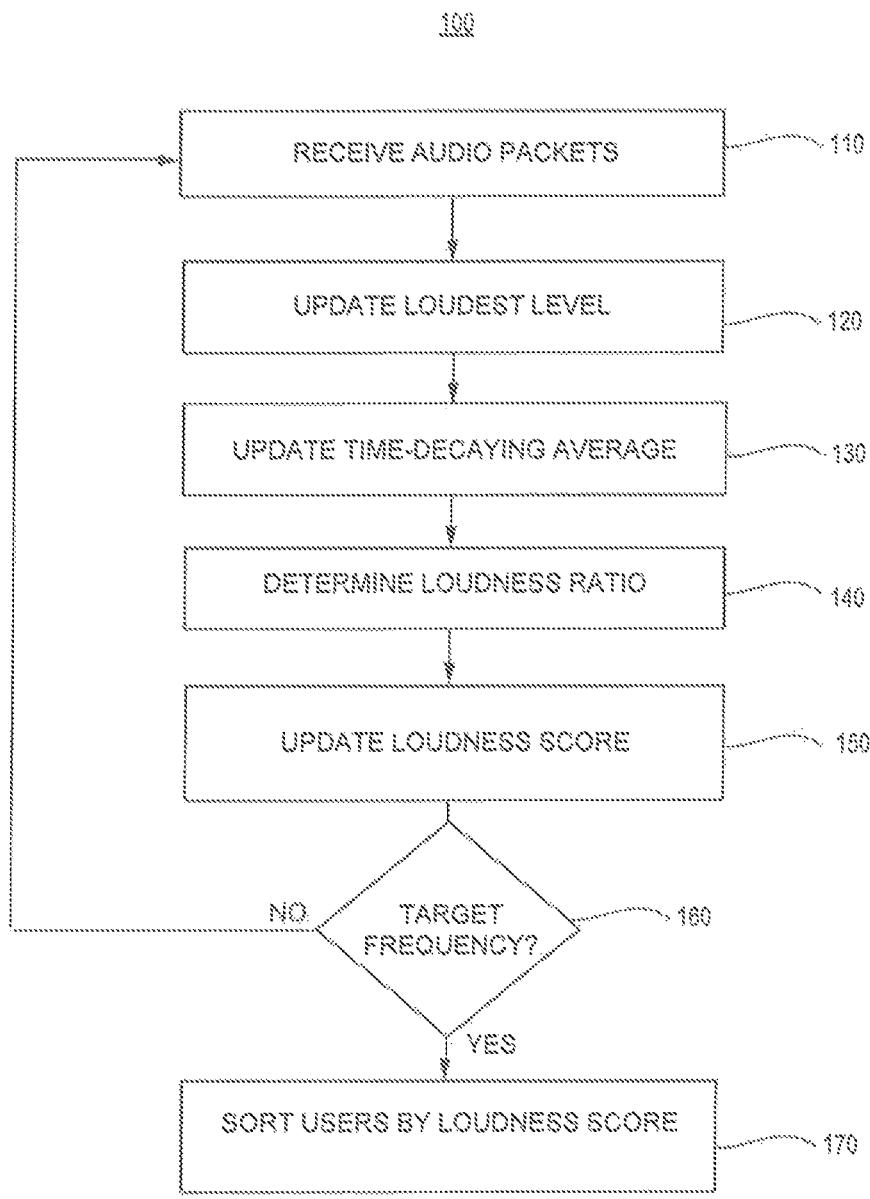
FIG. 1 is a flowchart of an example method for automatically determining the active users in a conference session including a plurality of users, according to an example embodiment of the present disclosure.

The disclosed embodiments relate to systems and methods for automatically determining the active users in an audio or video conference session including a plurality of users. Embodiments of the present disclosure may be implemented using a general-purpose computer. Alternatively, a special-purpose computer may be built according to embodiments of the present disclosure using suitable logic elements.

Advantageously, disclosed embodiments allow for determining the active users while accounting for extraneous background noises and the differences between the hardware and/or software used by various users. Additionally, embodiments of the present disclosure allow for muting audio and/or hiding video from inactive users, which may simplify participation in the conference session by reducing extra-sensory information delivered to each user.

According to an aspect of the present disclosure, a processor may receive audio packets from the plurality of users in a conference session. In some embodiments, the conference session may be an audio conference session. In other embodiments, the conference session may be a video conference session. The audio packets may conform to a pre-defined protocol. For example, the processor may receive audio packets conforming to real-time transport protocol (RTF), transmission control protocol (TCP), user datagram protocol (UDP), or any other suitable protocol.

In certain aspects, one or more users in the plurality of users may generate audio packets at a variable or an independently variable rate. For example, the processor may receive 50 packets per second from one user but may receive 33.3 packets per second from another user. In other aspects, one or more users in the plurality of users may generate audio packets at one or more rates that vary dependency. In other embodiments, one or more users in the plurality of users may generate audio packets at a fixed rate.

In some embodiments, the processor may receive audio packets including an audio level in decibels. Because the decibel scale is logarithmic, in some embodiments, the processor may convert the audio level of each audio packet to a linear audio level. Advantageously, this may simplify direct comparisons between the audio levels included in the audio packets received from each user in the plurality of users.

According to an aspect of the present disclosure, the processor may store a loudest audio level associated with each user in the plurality of users. In some embodiments, the loudest audio level associated with each user may be initialized at zero before any audio packets are received. In other embodiments, the loudest audio level associated with each user may be initialized with a positive, non-zero value before any audio packets are received. Advantageously, initializing the loudest audio level with a non-zero value may present sudden increases in the loudest audio level associated with a user if that user generates an unusually loud background noise.

In some embodiments, the processor may initialize, sometimes randomly, the loudest audio level associated with each user. In certain aspects, the randomization may be individualized to each user. For example, the processor may initialize the loudest audio level associated with the first user to a first value, initialize the loudest audio level associated with the second user to a second value, etc. In other aspects, the randomization may be universalized to all users. For example, the processor may initialize the loudest audio level associated with each user to the same random value. In other aspects, the randomization of the initial loudest audio level may comprise a combination of the previous two aspects. For example, the processor may initialize the loudest audio level associated with the first user and the loudest audio level associated with the second user to a first random value, initialize the loudest audio level associated with the third user to a second random value, etc.

In another embodiment, the processor may initialize the loudest audio level associated with each user based on the brand and/or model of the microphone used by each user and one or more known characteristics of that brand and/or model. For example, the one or more known characteristics may include type of transducer directivity, frequency response, sensitivity, output impedance, signal/noise relation, maximum sound pressure level, etc. In another embodiment, the loudest audio level associated with each user may be initialized based on one or more known characteristics of the interface connecting the microphone used by each user to the conference session. For example, the interface may include a hardware port, a software driver, an operating system, etc. The loudest audio level associated with each user may be initialized based on a combination of one or more known characteristics of the brand and/or model of microphone used by each user and one or more known characteristics of the interface connecting the microphone used by each user to the conference session.

According to an aspect of the present disclosure, the processor may determine if the audio packet received from a user is louder than all of the previously received audio packets from that user. If so, the processor may then update the loudest audio level associated with that user based on the received audio packet. If not, the processor may retain the current loudest audio level associated with that user.

For example, if the processor receives an audio packet with a linear audio level of 10 from a user, and the loudest audio level associated with that user is currently 5, the processor will updated the loudest audio level associated with that user to be 10. Similarly, if the processor receives an audio packet with a linear audio level of 5 from a user, and the loudest audio level associated with that user is currently 10, the processor will retain the loudest audio level associated with that user at 10.

According to an aspect of the present disclosure, the processor may calculate a time-decaying average associated with each user in the conference session. The time-decaying average associated with a user may be defined as the maximum of either the presently received audio packet from that user or the time-decaying average associated with that user from the previous iteration discounted by a discount factor. For example, the time-decaying average associated with a user may be defined as in Equation 1 below.

$$\text{avg}_{L,i} = \max(a_L, \text{avg}_{L,i-1} * N) \qquad \text{Equation 1}$$

In the example of Equation 1, $\text{avg}_{L,i}$ may represent the time-decaying average associated with a user in iteration i, $\text{avg}_{L,i-1}$ may represent the time-decaying average associated with that user in the previous iteration, i.e., iteration i-1, $a_L$ may represent the audio level included in the audio packet received from that user in iteration i, and N may represent a discount factor. The discount factor may be a defined number greater than zero and less than one. For example, the discount factor may be set to be equal to 0.965, 0.975, 0.985, etc.

For example, if the processor receives an audio packet with a linear audio level of 10 from a user, and the time-decaying average associated with that user from the previous iteration is 5, the processor will calculate the time-decaying average associated with that user in the current iteration as 10. Similarly, if the processor receives an audio packet with a linear audio level of 5 from a user, and the time-decaying average associated with that user from the previous iteration is 10, the processor will calculate the time-decaying average associated with that user in the current iteration as 10 multiplied by the discount factor, provided that the discount factor is greater than 0.5.

According to an aspect of the present disclosure, the processor may calculate a loudness ratio associated with each user in the plurality of users. The loudness ratio may be defined as the ratio of the time-decaying average associated with a user to the loudest audio level associated with that user, multiplied by a scaling factor. For example, the loudness ratio associated with a user may be defined as in Equation 2 below.

$$r = \left(\frac{\text{avg}_L}{\text{max}_L}\right) * M \qquad \text{Equation 2}$$

In the example of Equation 2, r may represent the loudness ratio associated with a user, $\text{avg}_L$ may represent the time-decaying average associated with that user, $\text{max}_L$ may represent the loudest level associated with that user, and M may represent a scaling factor. The scaling factor may be a defined integer greater than one. For example, the scaling factor may be set to be equal to 90, 100, 110, etc.

For example, if the time-decaying average associated with a user in the current iteration is 9.8, and the loudest audio level associated with that user is 10, the processor will calculate the loudness ratio associated with that user in the current iteration to be 0.98 multiplied by the scaling factor. Similarly, if the time-decaying average associated with a user in the current iteration is 50.5, and the loudest audio level associated with that user is 80, the processor will calculate the loudness ratio associated with that user in the current iteration to be 0.63125 multiplied by the scaling factor.

Advantageously, the loudness ratio measures the loudness of each user relative to the loudest sound received from that user rather than using the absolute loudness of each user. This may account for extraneous background noises and the differences between the hardware and/or software used by various users.

According to an aspect of the present disclosure, the processor may update the loudness score associated with each user in the conference session. The loudness score is an integer with a minimum value of 0, and the loudness score may have a predetermined maximum value. For example, the maxim urn value may be preset at 100. In such an example, if the processor received 50 audio packets per second from a user, the loudness score associated with that user could increase from the minimum value to the maximum value (or vice versa) in no less than 2 seconds.

The processor may update the loudness score associated with a user based on a comparison of the loudness ratio associated with that user with a threshold. The threshold may be adapted to discern extraneous background noise from user activity. For example, the threshold may be set to be equal to 10. In other embodiments, the threshold may be set to be equal to 8, 9, 11, 12, etc.

If the loudness ratio associated with a user is greater than the threshold, which may be predetermined, the processor may increment the loudness score associated with that user. If the loudness ratio associated with that user is equal to or less than the predetermined threshold, the processor may decrement the loudness score associated with that user. In some embodiments, the processor may increment and decrement using traditional increment and decrement operators, i.e., with an incremental value of 1. In other embodiments, the processor may increment and decrement using other incremental values. These other incremental values are also integers. For example, the processor may increment and decrement using an incremental value of 2, 3, etc.

For example, if the loudness ratio associated with a user in the current iteration is 90.2, and the threshold is set at 10, the processor may increment the loudness score associated with that user by the incremental value, unless the loudness score associated with that user is already at the maximum value. (If incrementing the loudness score associated with that user by the incremental value would cause the loudness score associated with that user to increase beyond the maximum value, the processor may instead set the loudness score associated with that user to the maximum value.) Similarly, if the loudness ratio associated with a user in the current iteration is 9.2, and the threshold is set at 10, the processor may decrement the loudness score associated with that user by the incremental value, unless the loudness score associated with that user is already at the minimum value. (If decrementing the loudness score associated with that user by the incremental value would cause the loudness score associated with that user to decrease beyond the minimum value, the processor may instead set the loudness score associated with that user to the minimum value.)

In other embodiments, the processor may update the loudness score associated with a user based on a comparison of the loudness ratio associated with that user with a plurality of thresholds, which may be predetermined. For example, the processor may have a first threshold that is smaller than a second threshold. If the loudness ratio associated with that user is greater than both the first and the second thresholds, the processor may increment the loudness score associated with that user. If the loudness ratio associated with that user is equal to or less than the second threshold but greater than the first threshold, the processor may retain the previous loudness score associated with that user. If the loudness ratio associated with that user is less than the second threshold and equal to or less than the first threshold, the processor may decrement the loudness score associated with that user.

For example, if the loudness ratio associated with a user in the current iteration is 90.2, the first threshold is set at 10, and the second threshold is set at 30, the processor may increment the loudness score associated with that user by the incremental value, unless the loudness score associated with that user is already at the maximum value. (If incrementing the loudness score associated with that user by the incremental value would cause the loudness score associated with that user to increase beyond the maximum value, the processor may instead set the loudness score associated with that user to the maximum value.) Similarly, if the loudness ratio associated with a user in the current iteration is 29.7, the first threshold is set at 10, and the second threshold is set at 30, the processor may retain the loudness score associated with that user from the previous iteration. Similarly, if the loudness ratio associated with a user in the current iteration is 9.2, the first threshold is set at 10, and the second threshold is set at 30, the processor may decrement the loudness score associated with that user by the incremental value, unless the loudness score associated with that user is already at the minimum value. (If decrementing the loudness score associated with that user by the incremental value would cause the loudness score associated with that user to decrease beyond the minimum value, the processor may instead set the loudness score associated with that user to the minimum value.)

By way of additional example, the processor may have a first threshold that is smaller than a second threshold, which may be predetermined, and also have a first incremental value that is smaller than a second incremental value, which may be preset. If the loudness ratio associated with a user is greater than both the first and the second thresholds, the processor may increment the loudness score associated with that user by the second incremental value. If the loudness ratio associated with that user is equal to or less than the second threshold but greater than the first threshold, the processor may increment the loudness score associated with that user by the first incremental value. If the loudness ratio associated with that user is less than the second threshold and equal to or less than the first threshold, the processor may decrement the loudness score associated with that user, either by the first or second incremental value.

For example, if the loudness ratio associated with a user in the current iteration is 90.2, the first threshold is set at 10, and the second threshold is set at 30, the processor may increment the loudness score associated with that user by the second incremental value, unless the loudness score associated with that user is already at the maximum value. (If incrementing the loudness score associated with that user by the second incremental value would cause the loudness score associated with that user to increase beyond the maximum value, the processor may instead set the loudness score associated with that user to the maximum value.) Similarly, if the loudness ratio associated with a user in the current iteration is 29.7, the first threshold is set at 10, and the second threshold is set at 30, the processor may increment the loudness score associated with that user by the first incremental value, unless the loudness score associated with that user is already at the maximum value. If incrementing the loudness score associated with that user by the first incremental value would cause the loudness score associated with that user to increase beyond the maximum value, the processor may instead set the loudness score associated with that user to the maximum value. Similarly, if the loudness ratio associated with a user in the current iteration is 9.2, the first threshold is set at 10, and the second threshold is set at 30, the processor may decrement the loudness score associated with that user by either the first or second incremental value, unless the loudness score associated with that user is already at the minimum value. If decrementing the loudness score associated with that user by either the first or the second incremental value would cause the loudness score associated with that user to decrease beyond the minimum value, the processor may instead set the loudness score associated with that user to the minimum value.

By way of additional example, the processor may have a first threshold that is smaller than a second threshold, which may be predetermined, and also have a first incremental value that is smaller than a second incremental value, which may be preset. If the loudness ratio associated with a user is greater than both the first and the second thresholds, the processor may increment the loudness score associated with that use, either by the first or second incremental value. If the loudness ratio associated with that user is equal to or less than the second threshold but greater than the first threshold, the processor may decrement the loudness score associated with that user by the first incremental value. If the loudness ratio associated with that user is less than the second threshold and equal to or less than the first threshold, the processor may decrement the loudness score associated with that user by the second incremental value.

For example, if the loudness ratio associated with a user in the current iteration is 90.2, the first threshold is set at 10, and the second threshold is set at 30, the processor may increment the loudness score associated with that user by either the first or second incremental value, unless the loudness score associated with that user is already at the maximum value. If incrementing the loudness score associated with that user by either the first or the second incremental value would cause the loudness score associated with that user to increase beyond the maximum value, the processor may instead set the loudness score associated with that user to the maximum value. Similarly, if the loudness ratio associated with a user in the current iteration is 29.7, the first threshold is set at 10, and the second threshold is set at 30, the processor may decrement the loudness score associated with that user by the first incremental value, unless the loudness score associated with that user is already at the minimum value. If decrementing the loudness score associated with that user by the first incremental value would cause the loudness score associated with that user to decrease beyond the minimum value, the processor may instead set the loudness score associated with that user to the minimum value. Similarly, if the loudness ratio associated with a user in the current iteration is 9.2, the first threshold is set at 10, and the second threshold is set at 30, the processor may decrement the loudness score associated with that user by the second incremental value, unless the loudness score associated with that user is already at the minimum value. If decrementing the loudness score associated with that user by the second incremental value would cause the loudness score associated with that user to decrease beyond the minimum value, the processor may instead set the loudness score associated with that user to the minimum value.

Other embodiments beyond these examples that utilize additional incremental values and/or thresholds in different combinations are also possible. The examples given above are example and explanatory only and are not restrictive of the disclosed embodiments.

According to an aspect of the present disclosure, the processor may sort the plurality of users by the loudness score associated with each user. The processor may use any sorting algorithm known in the art. For example, the processor may use a bubble sort algorithm, a bucket sort algorithm, an insertion sort algorithm, a selection sort algorithm, a heapsort algorithm, a mergesort algorithm, etc. In sorting the plurality of users, the processor may thereby rank which users are the most active according to the loudness score associated with each user. Advantageously, this may permit an accurate determination of which users are active and the degrees to which those users are active.

In some embodiments, the processor may sort at intervals determined by a target frequency, which may be preset. In certain aspects, the processor may sort after the processor receives a predetermined number of packets from the plurality of users. For example, the processor may sort after receiving at least 50 packets, 100 packets, 200 packets, etc. In other aspects, the processor may sort after a predetermined amount of time has passed. For example, the processor may sort once per second, once per two seconds, once per five seconds, etc.

In other embodiments, the processor may sort when the loudness score(s) associated with one or more users in the plurality of users reaches a predetermined threshold. For example, the processor may sort after the loudness score(s) associated with one or more users has reached the maximum value. Similarly, the processor may sort after the loudness score(s) associated with one or more users has reached the minimum value. In other aspects, the processor may sort after the loudness score(s) associated with one or more users has increased above a predetermined threshold not equal to the maximum or minimum values and/or deceased below a predetermined threshold not equal to the maximum or minimum values. For example, if the maximum value is 100, the processor may sort after the loudness score(s) associated with one or more users increases above 50, 60, 70, etc. Similarly, if the minimum value is 0, the processor may sort after the loudness score(s) associated with one or more users decreases below 40, 30, 20, etc.

In some embodiments, the processor may exclude a subset of the plurality of users when sorting. In some aspects, the processor may exclude the subset of users for which the associated loudness score is equal to or below a certain threshold. For example, the processor may exclude the subset of users for which the associated loudness score is equal to 0, equal to or below 2, equal to or below 5, etc. Advantageously, this allows the processor to sort more efficiently by excluding relatively inactive users.

In other aspects, the processor may exclude the subset of users for which the associated loudness score was equal to or below a certain threshold in a predetermined number of past sortings. For example, the processor may exclude the subset of users for which the associated loudness score was equal to 0, equal to or below 2, equal to or below 5, etc., at least once, twice, thrice, etc., in the previous one, two, three, etc. sortings. Advantageously, this may prevent a sudden background noise from placing an inactive user at or near the top of the sorting.

Similarly, the processor may reject a sorting if the processor determines that the sorting included a subset of users for which the associated loudness score was equal to or below a certain threshold in a predetermined number of past sortings. For example, the processor may reject a sorting if the processor determines that the sorting included a subset of users for which the associated loudness score was equal to 0, equal to or below 2, equal to or below 5, etc., at least once, twice, thrice, etc., in the previous one, two, three, etc. sortings. Advantageously, this may allow the processor to reject any changes in sorting on account of a sudden jump in loudness score associated with one or more users.

According to an aspect of the present disclosure, the processor may mute the audio received from all but the top subset of the plurality of users based on the sorting. For example, the processor may mute the audio received from all but the top two, three, four, etc. users, according to the sorting.

According to an aspect of the present disclosure, the processor may hide the video received from all but the top subset of the plurality of users based on the sorting. For example, the processor may mute the audio received from all but the top two, three, four, five, etc. users, according to the sorting.

Turning now to FIG. 1, there is shown a flowchart of example method 100 for automatically determining the active users in a conference session including a plurality of users. Method 100 may be implemented using a general-purpose computer including a processor, e.g., computing device 800. Alternatively, a special-purpose computer may be built for implementing method 100 using suitable logic elements.

At step 110, the processor receives one or more audio packets from a plurality of users. For example, the plurality of users may comprise a plurality of participants in an audio conference session. In other instances, the plurality of users may comprise the plurality of participants in a video conference session. Each user may independently comprise one or more participants. For example, a first user may comprise one participant, and a second user may comprise three participants.

At step 120, the processor updates the loudest audio level associated with each user based on the audio packet received from that user. For example, the processor may determine if the audio packet received from the user is louder than all of the previously received audio packets from that user. If so, the processor may then update the loudest audio level associated with that user based on the received audio packet. If not, the processor may retain the current loudest audio level associated with that user.

At step 130, the processor updates the time-decaying average associated with each user based on the loudest audio level associated with that user. For example, the time-decaying average may be calculated as the maximum of either the presently received audio packet from the user or the time-decaying average associated with that user from the previous iteration discounted by a discount factor.

At step 140, the processor calculates the loudness ratio associated with each user based on the time-decaying average associated with that user. For example, the loudness ratio may be calculated as the ratio of the time-decaying average associated with a user to the loudest audio level associated with that user, multiplied by a scaling factor.

At step 150, the processor updates the loudness score associated with each user based on the loudness ratio associated with that user. For example, if the loudness ratio associated with a user is greater than a predetermined threshold, the processor may increment the loudness score associated with that user by a predetermined incremental value, and if the loudness ratio associated with that user is equal to or less than the predetermined threshold, the processor may decrement the loudness score associated with that user by the predetermined incremental value.

Other embodiments of method 100 may include additional incremental values and/or thresholds in various combinations at step 150. The example given above is explanatory only and is not restrictive of the disclosed embodiments.

At step 160, the processor determines if a predetermined target frequency has been reached. For example, the target frequency may be reached when the processor receives a predetermined number of packets. In other instances, the target frequency may be reached when the processor determines that a predetermined amount of time, e.g., a predetermined number of seconds, has passed. If the target frequency has been reached, the processor continues to step 170, if the target frequency has not been reached, the processor returns to step 110.

In other embodiments, the processor may determine if a predetermined loudness threshold has been reached. For example, the loudness threshold may be reached when the loudness score(s) associated with one or more users has reached a predetermined value. For instance, the predetermined value may be equal to the maximum value or the minimum value. In other instances, the predetermined value may be equal to a number intermediate between the maximum value and the minimum value.

At step 170, the processor sorts the plurality of users by the loudness score associated with each user. For example, the processor may sort the plurality of users using a bubble sort algorithm, a bucket sort algorithm, an insertion sort algorithm, a selection sort algorithm, a heapsort algorithm, a mergesort algorithm, etc.

Method 100 may further include additional steps. For example, method 100 may include converting the audio level of each audio packet from decibels (i.e., a logarithmic audio level) to a linear audio level before updating the loudest audio level. Advantageously, this may permit direct comparison of audio levels between audio packets.

Method 100 may further include excluding a subset of users before sorting the remaining users of the plurality of users. For example, the processor may exclude a subset of users for which the associated loudness score is equal to or below a certain threshold. In other instances, the processor may exclude a subset of users for which the associated loudness score was equal to or below a certain threshold in a predetermined number of past sortings. Advantageously, this may allow the processor to sort more efficiently by excluding relatively inactive users.

Figure 2:
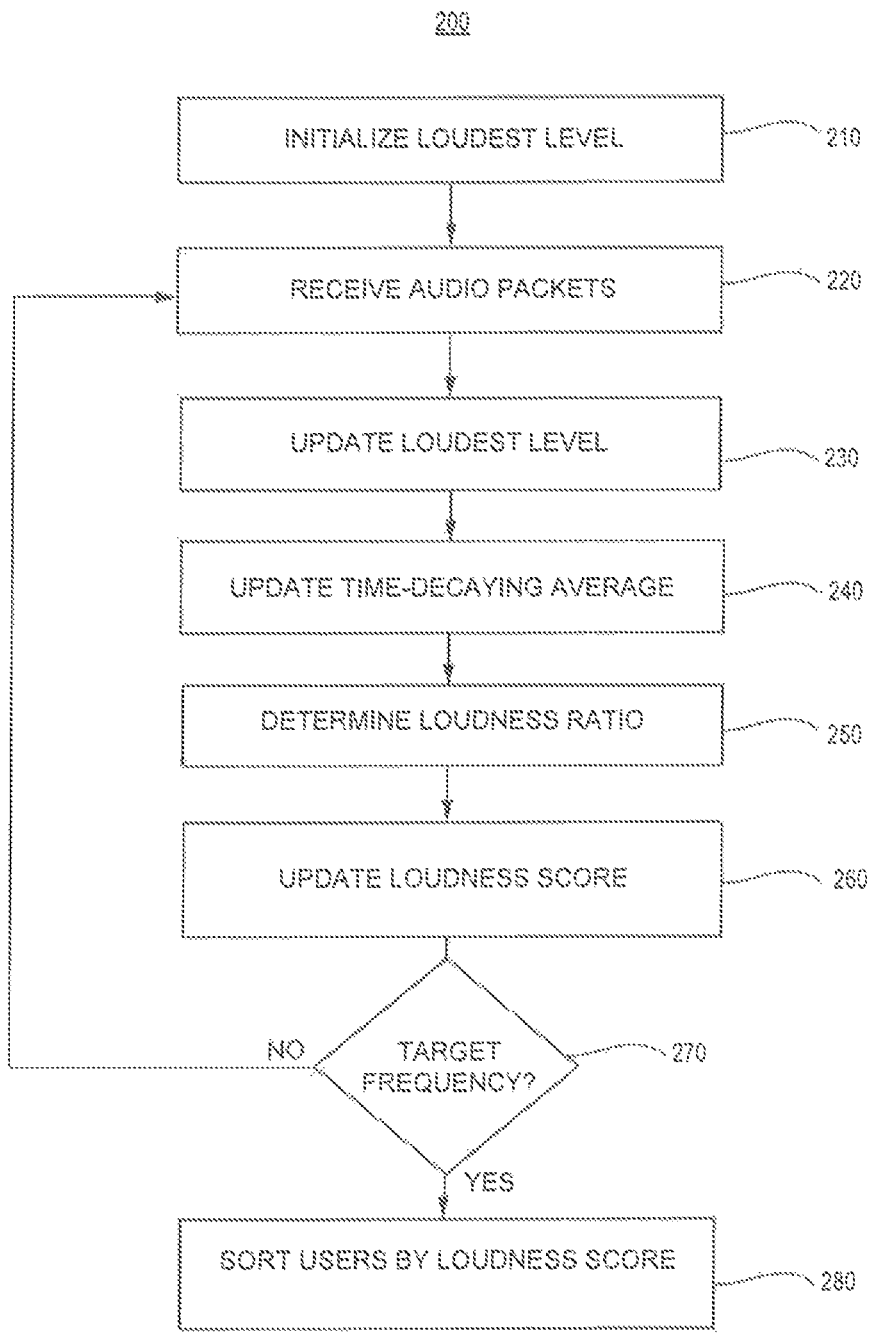
FIG. 2 is a flowchart of another example method for automatically determining the active users in a conference session including a plurality of users, according to another example embodiment of the present disclosure.

FIG. 2 is a flowchart of example method 200 for automatically determining the active users in a conference session including a plurality of users. Method 200 may be implemented using a general-purpose computer including a processor, e.g., computing device 800. Alternatively, a special-purpose computer may be built for implementing method 200 using suitable logic elements.

At step 210, the processor initializes the loudest audio level associated with each user. For instance, the processor may randomly initialize the loudest audio level associated with each user. The randomization might be individualized to each user, universalized for all users, or comprise a combination thereof. In other instances, the initialization may be based on the brand and/or model of the microphone used by each user and one or more known characteristics of that brand and/or model. In other instances, the initialization may be based on one or more known characteristics of the interlace connecting the microphone used by each user to the conference session.

At step 220, the processor receives one or more audio packets from a plurality of users. For example, the plurality of users may comprise a plurality of participants in an audio conference session. In other aspects, the plurality of users may comprise the plurality of participants in a video conference session. Each user may independently comprise one or more participants. For example, a first user may comprise one participant, and a second user may comprise three participants.

At step 230, the processor updates the loudest audio level associated with each user based on the audio packet received from that user. For example, the processor may determine if the audio packet received from the user is louder than all of the previously audio packets received from that user. If so, the processor may then update the loudest audio level associated with that user based on the received audio packet. If not, the processor may retain the current loudest audio level associated with that user.

At step 240, the processor updates the time-decaying average associated with each user based on the loudest audio level associated with that user. For example, the time-decaying average may be calculated as the maximum of either the presently received audio packet from the user or the time-decaying average associated with that user from the previous iteration discounted by a discount factor.

At step 250, the processor calculates the loudness ratio associated with each user based on the time-decaying average associated with that user. For example, the loudness ratio may be calculated as the ratio of the time-decaying average associated with a user to the loudest audio level associated with that user, multiplied by a scaling factor.

At step 260, the processor updates the loudness score associated with each user based on the loudness ratio associated with that user. For example, if the loudness ratio associated with a user is greater than a predetermined threshold, the processor may increment the loudness score associated with that user, and if the loudness ratio associated with that user is equal to or less than the predetermined threshold, the processor may decrement the loudness score associated with that user.

Other embodiments of method 200 may include additional incremental values and/or thresholds in various combinations at step 260, The example given above is explanatory only and is not restrictive of the disclosed embodiments.

At step 270, the processor determines if a predetermined target frequency has been reached. For example, the target frequency may be reached when a predetermined number of packets have been received. In other instances, the target frequency may be reached when a predetermined amount of time, e.g., seconds, has passed. If the target frequency has been reached, the processor continues to step 280. If the target frequency has not been reached, the processor returns to step 220.

In other embodiments, the processor may determine if a predetermined loudness threshold has been reached. For example, the loudness threshold may be reached when the loudness score(s) associated with one or more users has reached a predetermined value. For instance, the predetermined value may be equal to the maximum value or the minimum value. In other instances, the predetermined value may be equal to a number intermediate between the maximum value and the minimum value.

At step 280, the processor sorts the plurality of users by the loudness score associated with each user. For example, the processor may sort the plurality of users using a bubble sort algorithm, a bucket sort algorithm, an insertion sort algorithm, a selection sort algorithm, a heapsort algorithm, a mergesort algorithm, etc.

Method 200 may further include additional steps. For example, method 200 may include converting the audio level of each audio packet from decibels (i.e., a logarithmic audio level) to a linear audio level before updating the loudest audio level. Advantageously, this may permit direct comparison of audio levels between audio packets.

Method 200 may further include excluding a subset of users before sorting the remaining users of the plurality of users. For example, the processor may exclude a subset of users for which the associated loudness score is equal to or below a certain threshold. In other instances, the processor may exclude a subset of users for which the associated loudness score was equal to or below a certain threshold in a predetermined number of past sortings. Advantageously, this may allow the processor to sort more efficiently by excluding relatively inactive users.

Figure 3:
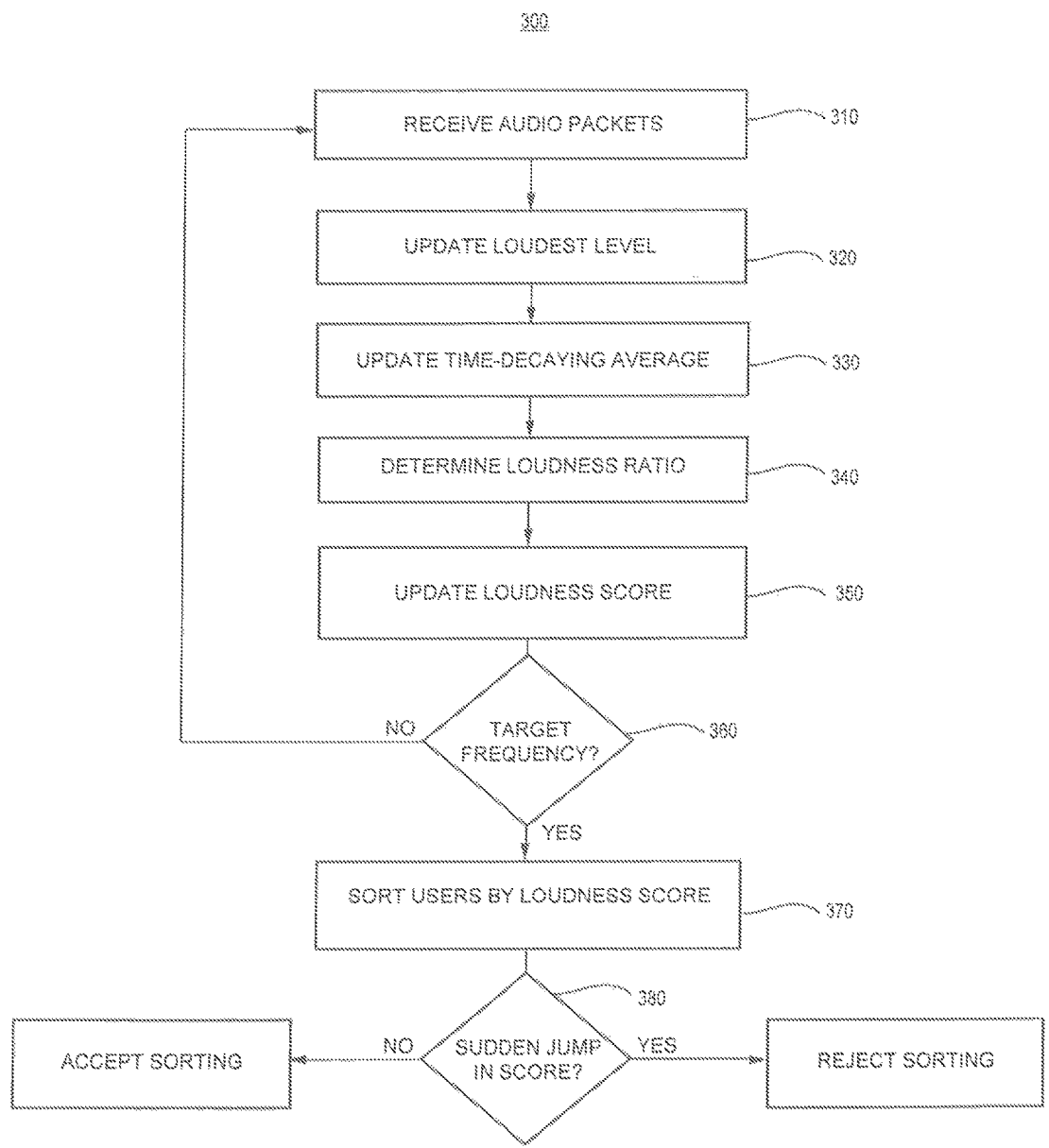
FIG. 3 is a flowchart of yet another example method for automatically determining the active users in a conference session including a plurality of users, according to another example embodiment of the present disclosure.

FIG. 3 is a flowchart of example method 300 for automatically determining the active users in a conference session including a plurality of users. Method 300 may be implemented using a general-purpose computer including a processor, e.g., computing device 800. Alternatively, a special-purpose computer may be built for implementing method 300 using suitable logic elements.

At step 310, the processor receives one or more audio packets from a plurality of users. For example, the plurality of users may comprise a plurality of participants in an audio conference session. In other aspects, the plurality of users may comprise the plurality of participants in a video conference session. Each user may independently comprise one or more participants. For example, a first user may comprise one participant, and a second user may comprise three participants.

At step 320, the processor updates the loudest audio level associated with each user based on the audio packet received from that user. For example, the processor may determine if the audio packet received from the user is louder than all of the previously audio packets received from that user. If so, the processor may then update the loudest audio level associated with that user based on the received audio packet. If not, the processor may retain the current loudest audio level associated with that user.

At step 330, the processor updates the time-decaying average associated with each user based on the loudest audio level associated with that user. For example, the time-decaying average may be calculated as the maximum of either the presently received audio packet from the user or the time-decaying average associated with that user from the previous iteration discounted by a discount factor.

At step 340, the processor determines the loudness ratio associated with each user based on the time-decaying average associated with that user. For example, the loudness ratio may be calculated as the ratio of the time-decaying average associated with a user to the loudest audio level associated with that user, multiplied by a scaling factor.

At step 350, the processor updates the loudness score associated with each user based on the loudness ratio associated with that user. For example, it the loudness ratio associated with a user is greater than a predetermined threshold, the processor may increment the loudness score associated with that user, and if the loudness ratio associated with that user is equal to or less than the predetermined threshold, the processor may decrement the loudness score associated with that user.

Other embodiments of method 300 may include additional incremental values and/or thresholds in various combinations at step 350. The example given above is explanatory only and is not restrictive of the disclosed embodiments.

At step 360, the processor determines if a predetermined target frequency has been reached. For example, the target frequency may be reached when a predetermined number of packets have been received. In other instances, the target frequency may be reached when a predetermined amount of time, e.g., seconds, has passed. If the target frequency has been reached, the processor continues to step 370, if the target frequency has not been reached, the processor returns to step 310.

In other embodiments, the processor may determine if a predetermined loudness threshold has been reached. For example, the loudness threshold may be reached when the loudness score(s) associated with one or more users has reached a predetermined value. For instance, the predetermined value may be equal to the maximum value or the minimum value. In other instances, the predetermined value may be equal to a number intermediate between the maximum value and the minimum value.

step 370, the processor sorts the plurality of users by the loudness score associated with each user. For example, the processor may sort the plurality of users using a bubble sort algorithm, a bucket sort algorithm, an insertion sort algorithm, a selection sort algorithm, a heapsort algorithm, a mergesort algorithm, etc.

At step 380, the processor determines whether there was a sudden jump in loudness score associated with one or more users. For example, a sudden jump may occur where the sorting included a subset of users for which the associated loudness score was equal to or below a certain threshold in a predetermined number of past sortings. If the processor determines there was a sudden jump in loudness score associated with one or more users, the processor may reject the sorting performed in step 370, and if the processor determines there was not a sudden jump in loudness score associated with one or more users, the processor may accept the sorting performed in step 370.

Method 300 may further include additional steps. For example, method 300 may include initializing the loudest audio level associated with each user. For instance, the processor may randomly initialize the loudest audio level associated with each user. The randomization might be individualized to each user, universalized for all users, or comprise a combination thereof. In other instances, the initialization may be based on the brand and/or model of the microphone used by each user and one or more known characteristics of that brand and/or model. In other instances, the initialization may be based on one or more known characteristics of the interface connecting the microphone used by each user to the conference session.

Method 300 may further include converting the audio level of each audio packet from decibels (i.e., a logarithmic audio level) to a linear audio level before updating the loudest audio level. Advantageously, this may permit direct comparison of audio levels between audio packets.

Method 300 may further include excluding a subset of users before sorting the remaining users of the plurality of users. For example, the processor may exclude a subset of users for which the associated loudness score is equal to or below a certain threshold. In other instances, the processor may exclude a subset of users for which the associated loudness score was equal to or below a certain threshold in a predetermined number of past sortings. Advantageously, this may allow the processor to sort more efficiently by excluding relatively inactive users.

Figure 4:
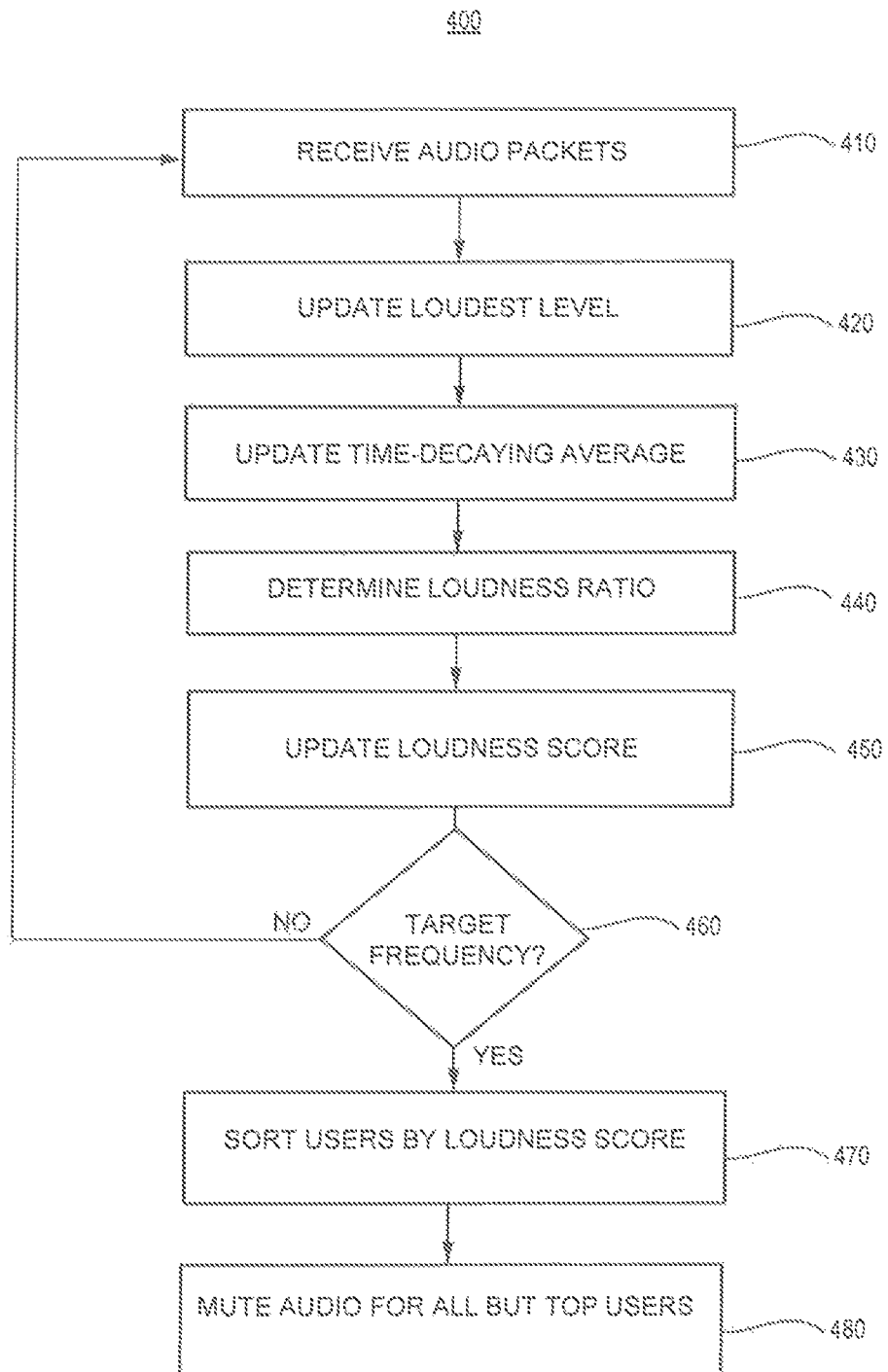
FIG. 4 is a flowchart of yet another example method for automatically determining the active users in a conference session including a plurality of users, according to another example embodiment of the present disclosure.

FIG. 4 is a flowchart of example method 400 for automatically determining the active users in a conference session including a plurality of users. Method 400 may be implemented using a general-purpose computer including a processor, e.g., computing device 800. Alternatively, a special-purpose computer may be built for implementing method 400 using suitable logic elements.

At step 410, the processor receives one or more audio packets from a plurality of users. For example, the plurality of users may comprise a plurality of participants in an audio conference session. In other aspects, the plurality of users may comprise the plurality of participants in a video conference session. Each user may independently comprise one or more participants. For example, a first user may comprise one participant, and a second user may comprise three participants.

At step 420, the processor updates the loudest audio level associated with each user based on the audio packet received from that user. For example, the processor may determine if the audio packet received from the user is louder than all of the previously audio packets received from that user. If so, the processor may then update the loudest audio level associated with that user based on the received audio packet. If not, the processor may retain the current loudest audio level associated with that user.

At step 430, the processor updates the time-decaying average associated with each user based on the loudest audio level associated with that user. For example, the time-decaying average may be calculated as the maximum of either the presently received audio packet from the user or the time-decaying average associated with that user from the previous iteration discounted by a discount factor.

At step 440, the processor determines the loudness ratio associated with each user based on the time-decaying average associated with that user. For example, the loudness ratio may be calculated as the ratio of the time-decaying average associated with a user to the loudest audio level associated with that user, multiplied by a scaling factor.

At step 450, the processor updates the loudness score associated with each user based on the loudness ratio associated with that user. For example, if the loudness ratio associated with a user is greater than a predetermined threshold, the processor may increment the loudness score associated with that user, and if the loudness ratio associated with that user is equal to or less than the predetermined threshold, the processor may decrement the loudness score associated with that user.

Other embodiments of method 400 may include additional incremental values and/or thresholds in various combinations at step 450. The example given above is explanatory only and is not restrictive of the disclosed embodiments.

At step 460, the processor determines if a predetermined target frequency has been reached. For example, the target frequency may be reached when a predetermined number of packets have been received. In other instances, the target frequency may be reached when a predetermined amount of time, e.g., seconds, has passed. If the target frequency has been reached, the processor continues to step 470. If the target frequency has not been reached, the processor returns to step 410.

In other embodiments, the processor may determine if a predetermined loudness threshold has been reached. For example, the loudness threshold may be reached when the loudness score(s) associated with one or more users has reached a predetermined value. For instance, the predetermined value may be equal to the maximum value or the minimum value. In other instances, the predetermined value may be equal to a number intermediate between the maximum value and the minimum value.

At step 470, the processor sorts the plurality of users by the loudness score associated with each user. For example, the processor may sort the plurality of users using a bubble sort algorithm, a bucket sort algorithm, an insertion sort algorithm, a selection sort algorithm, a heapsort algorithm, a mergesort algorithm, etc.

At step 480, the processor mutes the audio received from all but a subset of the plurality of users. For example, the subset may comprise one or more users with the highest associated loudness scores based on the sorting performed in step 470. For example, the processor may mute the audio received from all but the top two, three, four, etc. users, according to the sorting performed in step 470.

Method 400 may further include additional steps. For example, method 400 may include initializing the loudest audio level associated with each user. For instance, the processor may randomly initialize the loudest audio level associated with each user. The randomization might be individualized to each user, universalized for all users, or comprise a combination thereof. In other instances, the initialization may be based on the brand and/or model of the microphone used by each user and one or more known characteristics of that brand and/or model. In other instances, the initialization may be based on one or more known characteristics of the interface connecting the microphone used by each user to the conference session.

Method 400 may further include converting the audio level of each audio packet from decibels (i.e., a logarithmic audio level) to a linear audio level before updating the loudest audio level. Advantageously, this may permit direct comparison of audio levels between audio packets.

Method 400 may further include excluding a subset of users before sorting the remaining users of the plurality of users. For example, the processor may exclude a subset of users for which the associated loudness score is equal to or below a certain threshold. In other instances, the processor may exclude a subset of users for which the associated loudness score was equal to or below a certain threshold in a predetermined number of past sortings. Advantageously, this may allow the processor to sort more efficiently by excluding relatively inactive users.

Method 400 may further include determining whether there was a sudden jump in loudness score associated with one or more users before muting the audio received from all but the top subset of the plurality of users. For example, a sudden jump may occur where the sorting included a subset of users for which the associated loudness score was equal to or below a certain threshold in a predetermined number of past sortings. If the processor determines there was a sudden jump in loudness score associated with one or more users, the processor may reject the sorting performed in step 470, and if the processor determines there was not a sudden jump in loudness score associated with one or more users, the processor may accept the sorting performed in step 470. Advantageously, this may prevent a sudden background noise from placing an inactive user at or near the top of the sorting.

Figure 5:
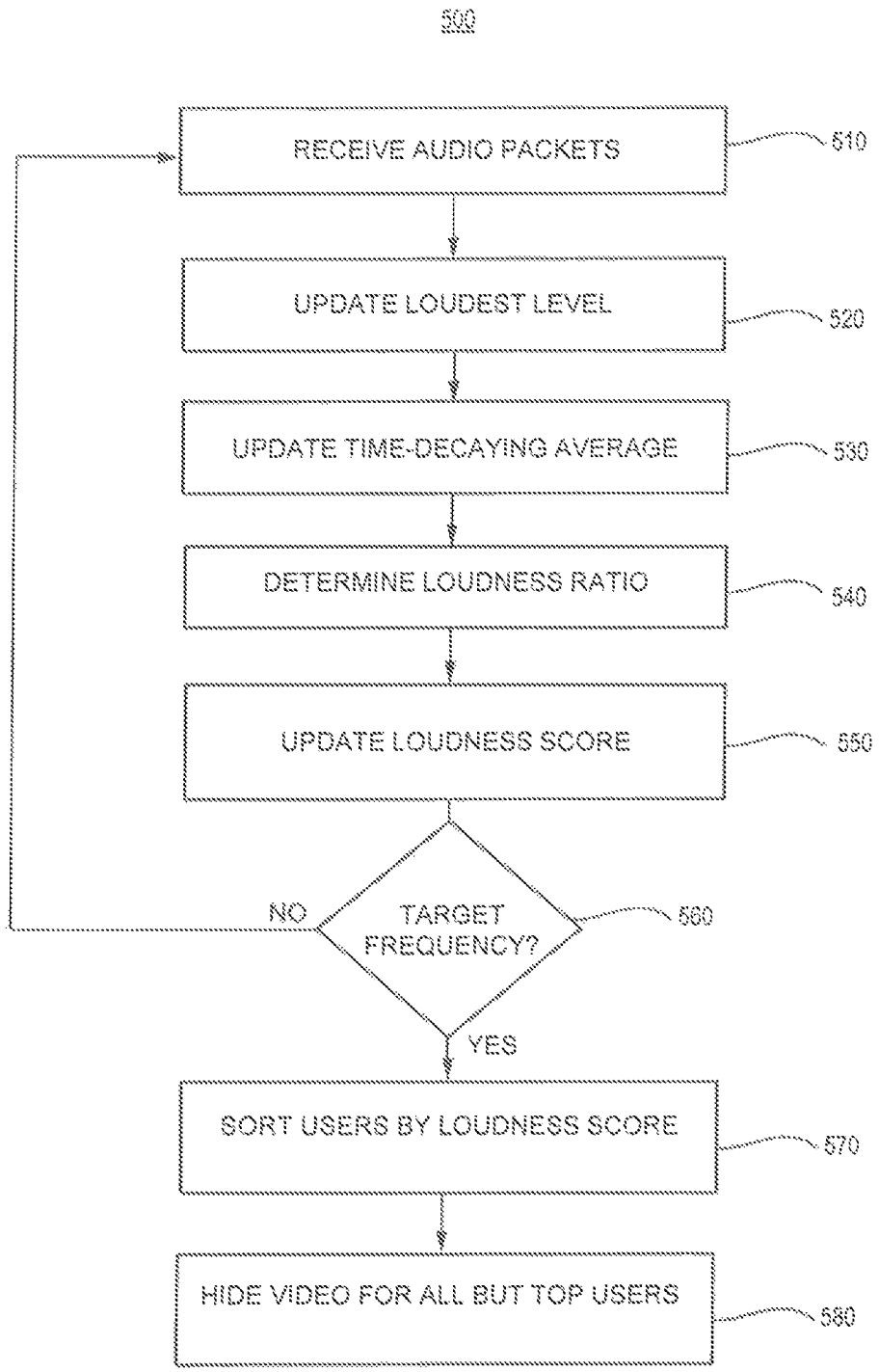
FIG. 5 is a flowchart of yet another example method for automatically determining the active users in a conference session including a plurality of users, according to yet another example embodiment of the present disclosure.

FIG. 5 is a flowchart of example method 500 for automatically determining the active users in a conference session including a plurality of users. Method 500 may be implemented using a general-purpose computer including a processor, e.g., computing device 800. Alternatively, a special-purpose computer may be built for implementing method 500 using suitable logic elements.

At step 510, the processor receives one or more audio packets from a plurality of users. For example, the plurality of users may comprise a plurality of participants in an audio conference session. In other aspects, the plurality of users may comprise the plurality of participants in a video conference session. Each user may independently comprise one or more participants. For example, a first user may comprise one participant, and a second user may comprise three participants.

At step 520, the processor updates the loudest audio level associated with each user based on the audio packet received from that user. For example, the processor may determine if the audio packet received from the user is louder than all of the previously audio packets received from that user. If so, the processor may then update the loudest audio level associated with that user based on the received audio packet. If not, the processor may retain the current loudest audio level associated with that user.

At step 530, the processor updates the time-decaying average associated with each user based on the loudest audio level associated with that user. For example, the time-decaying average may be calculated as the maximum of either the presently received audio packet from the user or the time-decaying average associated with that user from the previous iteration discounted by a discount factor.

At step 540, the processor determines the loudness ratio associated with each user based on the time-decaying average associated with that user. For example, the loudness ratio may be calculated as the ratio of the time-decaying average associated with a user to the loudest audio level associated with that user, multiplied by a scaling factor.

At step 550, the processor updates the loudness score associated with each user based on the loudness ratio associated with that user. For example, if the loudness ratio associated with a user is greater than a predetermined threshold, the processor may increment the loudness score associated with that user, and if the loudness ratio associated with that user is equal to or less than the predetermined threshold, the processor may decrement the loudness score associated with that user.

Other embodiments of method 500 may include additional incremental values and/or thresholds in various combinations at step 550. The example given above is explanatory only and is not restrictive of the disclosed embodiments.

At step 560, the processor determines if a predetermined target frequency has been reached. For example, the target frequency may be reached when a predetermined number of packets have been received. In other instances, the target frequency may be reached when a predetermined amount of time, e.g., seconds, has passed. If the target frequency has been reached, the processor continues to step 570. If the target frequency has not been reached, the processor returns to step 510.

In other embodiments, the processor may determine if a predetermined loudness threshold has been reached. For example, the loudness threshold may be reached when the loudness score(s) associated with one or more users has reached a predetermined value. For instance, the predetermined value may be equal to the maximum value or the minimum value. In other instances, the predetermined value may be equal to a number intermediate between the maximum value and the minimum value.

At step 570, the processor sorts the plurality of users by the loudness score associated with each user. For example, the processor may sort the plurality of users using a bubble sort algorithm, a bucket sort algorithm, an insertion sort algorithm, a selection sort algorithm, a heapsort algorithm, a mergesort algorithm, etc.

At step 580, the processor hides the video received from all but a subset of the plurality of users. For example, the subset may comprise one or more users with the highest associated loudness scores based on the sorting performed in step 570. For example, the processor may hide the video received from all but the top two, three, four, five, etc. users, according to the sorting performed in step 570.

Method 500 may further include additional steps. For example, method 500 may further include muting the audio received from all but the top subset of the plurality of users based on the sorting performed in step 570 after hiding the video received from all but the top subset of the plurality of users. For example, the processor may hide the video received from all but the top two, three, four, etc. users, according to the sorting performed in step 570. In some instances, the processor may hide the video received and mute the audio received from the same subset of users. In other instances, the processor may hide the video received from one subset of users and mute the audio received from a different subset of users. For example, the processor may hide the video received from ail but the top four users and mute the audio received from ail but the top three users, and vice versa.

Method 500 may further include initializing the loudest audio level associated with each user. For instance, the processor may randomly initialize the loudest audio level associated with each user. The randomization might be individualized to each user, universalized for all users, or comprise a combination thereof. In other instances, the initialization may be based on the brand and/or model of the microphone used by each user and one or more known characteristics of that brand and/or model. In other instances, the initialization may be based on one or more known characteristics of the interface connecting the microphone used by each user to the conference session.

Method 500 may further include converting the audio level of each audio packet from decibels (i.e., a logarithmic audio level) to a linear audio level before updating the loudest audio level. Advantageously, this may permit direct comparison of audio levels between audio packets.

Method 500 may further include excluding a subset of users before sorting the remaining users of the plurality of users. For example, the processor may exclude a subset of users for which the associated loudness score is equal to or below a certain threshold. In other instances, the processor may exclude a subset of users for which the associated loudness score was equal to or below a certain threshold in a predetermined number of past sortings. Advantageously, this may allow the processor to sort more efficiently by excluding relatively inactive users.

Method 500 may further include determining whether there was a sudden jump in loudness score associated with one or more users before hiding the video received from all but the top subset of the plurality of users. For example, a sudden jump may occur where the sorting included a subset of users for which the associated loudness score was equal to or below a certain threshold in a predetermined number of past sortings. If the processor determines there was a sudden jump in loudness score associated with one or more users, the processor may reject the sorting performed in step 570, and if the processor determines there was not a sudden jump in loudness score associated with one or more users, the processor may accept the sorting performed in step 570. Advantageously, this may prevent a sudden background noise from placing an inactive user at or near the top of the sorting.

Figure 6A:
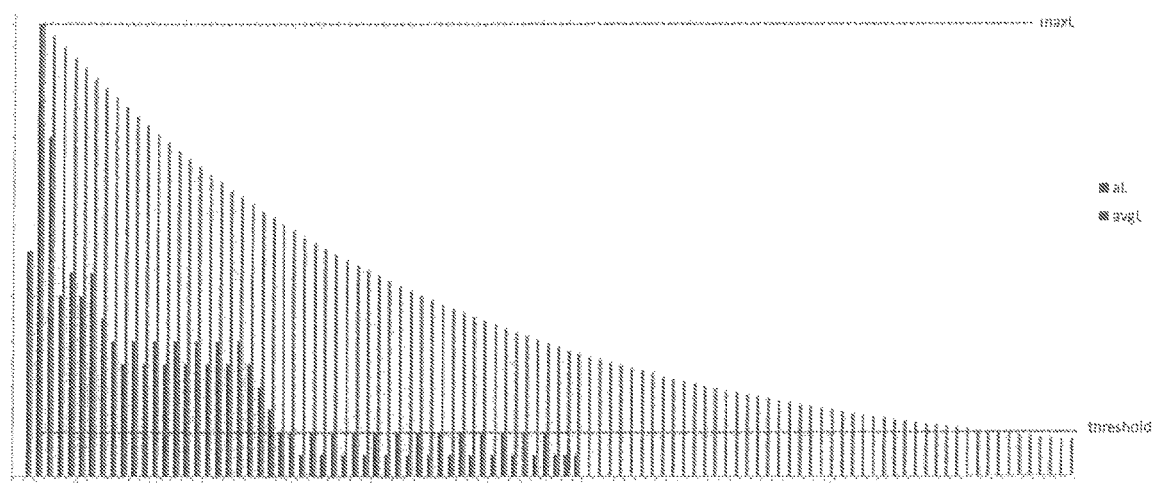
FIG. 6a is a graphical representation of an example calculation of the time-decaying average for an example user.

FIG. 6a is a graphical representation of an example calculation of the time-decaying average for an example user. As depicted in the example of FIG. 6a, al is the level of the incoming audio packet from the example user at time t, and avgL is the calculated time-decaying average associated with that user at time t. Moreover, maxL represents the maximum audio level that is used to calculate the loudness ratio. Similarly, "threshold" represents the threshold that is used to calculate the loudness score associated with the user.

As depicted in the example of FIG. 6a, time t increments whenever an audio packet is received from the example user. In the example of FIG. 6a, 100 audio packets are received from the example user; therefore, t ranges from 0 to 100. Accordingly, the example of FIG. 6a depicts a real amount of time equal to 100 audio packets divided by the rate at which the example user is sending audio packets. For example, if the example user of FIG. 6a sends 50 audio packets per second, FIG. 6a would depict a total of two seconds.

In the example of FIG. 6a, the threshold has been set to 10% of maxL. In other embodiments, the threshold may be preset to be a different percentage of maxL, e.g., 8%, 8%, 11%, 12%, etc. In the example of FIG. 6a, the discount factor has been preset to 0.975. In other embodiments, the discount factor may be preset to be a difference number greater than zero and less than one, e.g., 0.965, 0.985, etc.

Figure 6B:
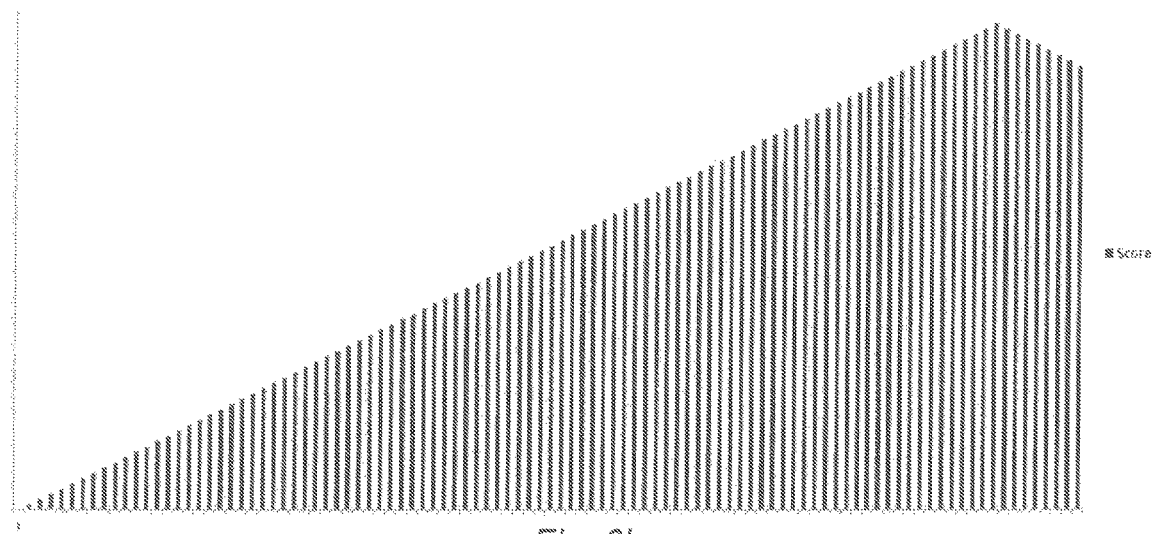

FIG. 6b is a graphical representation of an example calculation of the time score for the example user of FIG. 6a.

Figure 7A:
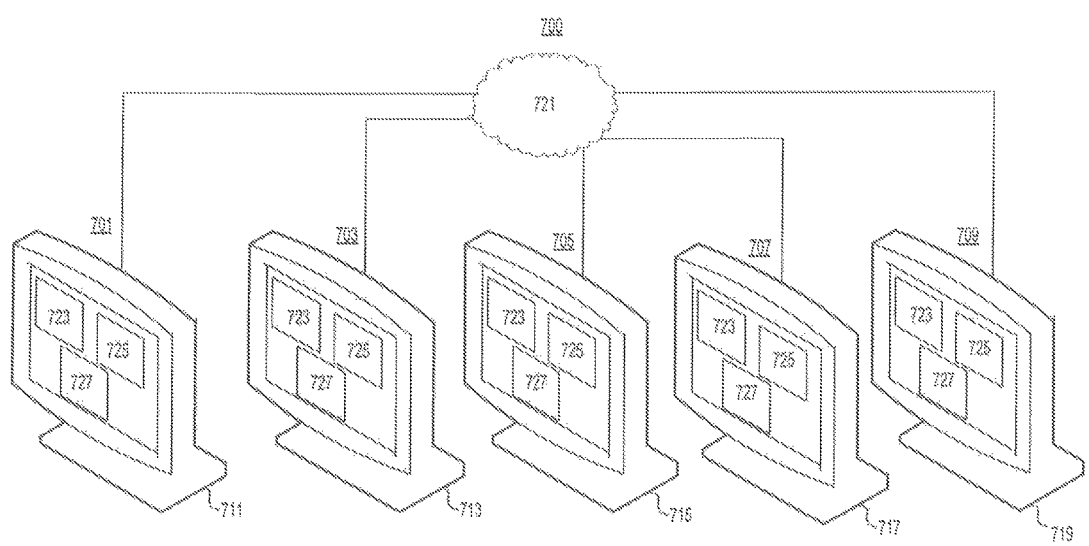
FIG. 7a is an illustration of an example video conferencing system using the example method of FIG. 5.

FIG. 7a is an illustration of video conferencing system 700 using example method 500 of FIG. 5. As depicted in FIG. 7a, system 700 includes a plurality of users, e.g., users 701, 703, 705, 707, and 709, participating in a video conference call.

In the example of FIG. 7a, users 701, 703, 705, 707, and 709 each comprise one participant accessing the video conference call via an individual computing system. For example, users 701, 703, 705, 707, and 709 may participate in the video conference call via computing systems 711, 713, 715, 717, and 719, which are connected via network 721.

Computing systems 711, 713, 715, 717, and 719 may each include a processor and memory (not shown). Computing systems 711, 713, 715, 717, and 719 may further include peripherals such as displays, speakers, microphones, cameras, keyboards, mice, etc. (not shown). In some embodiments, the computing systems may comprise general purpose computers, special-purpose computers, smart phones, etc. Network 721 may comprise a local access network, an intranet, the internet, etc. Network 721 may further include one or more conferencing servers (not shown) that manage the conference call between the plurality of users.

In the example of FIG. 7a, the memories of computing systems 711, 713, 715, 717, and 719 include video conferencing software such that example method 500 of FIG. 5 is executed by the corresponding processors. In other aspects, network 721 may include a server executing example method 500 of FIG. 5. in other embodiments, example methods 100, 200, 300, or 400 may be executed in place of method 500.

As depicted in FIG. 7a, the display of each computing system used by the plurality of users only displays video from the three most active users in the video conference call, e.g., videos 723, 725, and 727. In other embodiments, the display of each computing system used by the plurality of users may display video from the two, four, five, etc. most active users in the video conference call. Similarly, the speakers of each computing system used by the plurality of users may only play audio from the two, three, four, five, etc. most active users in the video conference call.

Figure 7B:
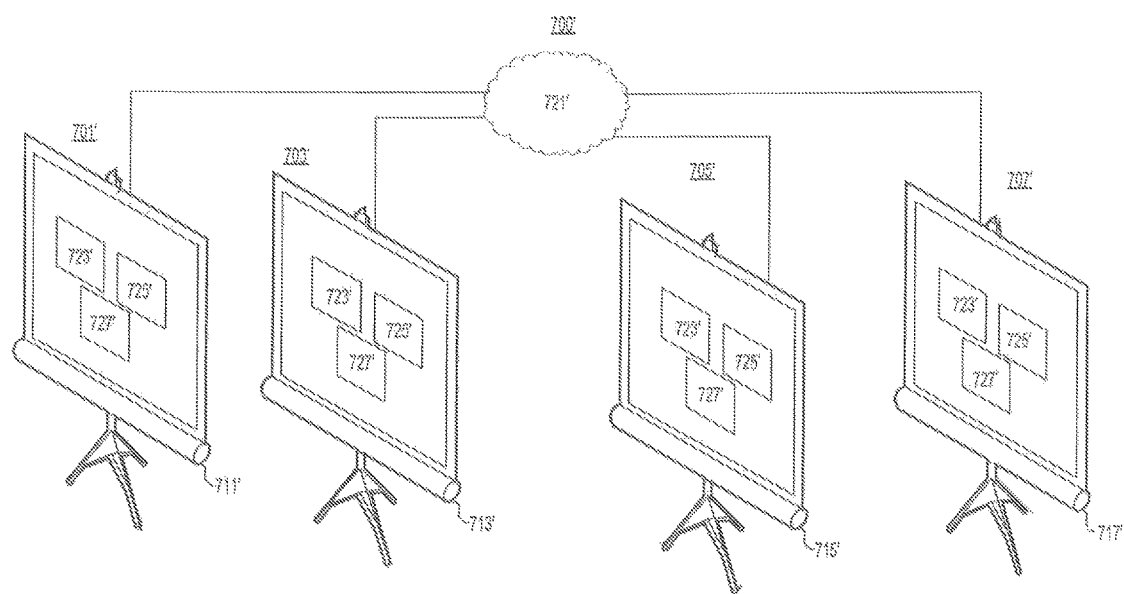
FIG. 7b is an illustration of another example video conferencing system using the example method of FIG. 5.

FIG. 7b is an illustration of video conferencing system 700' using example method 500 of FIG. 5. As depicted in FIG. 7b, system 700' includes a plurality of users, e.g., users 701', 703', 705', and 707', participating in a video conference call.

In the example of FIG. 7b, users 701', 703', 705', and 707' each comprise one or more participants accessing the video conference call via a group conference system. For example, users 701', 703', 705', and 707' may participate in the video conference call via conference room systems, e.g., systems 711', 713', 715', and 717', which are connected via network 721'.

Conference room systems 711', 713', 715', and 717' may each include a processor and memory (not shown). Conference room systems 711', 713', 715', and 717' may further include peripherals such as projection screens, projectors, speakers, microphones, cameras, keyboards, mice, etc. (not shown). In some embodiments, the conference rooms systems may comprise general purpose computers, special-purpose computers, etc. Network 721' may comprise a local access network, an intranet, the Internet, etc.

In the example of FIG. 7b, the memories of conference room systems 711', 713', 715', and 717' include video conferencing software such that example method 500 of FIG. 5 is executed by the corresponding processors. In other aspects, network 721' may include a server executing example method 500 of FIG. 5. In other embodiments, example methods 100, 200, 300, or 400 may be used in place of method 500.

As depicted in FIG. 7b, the screen of each conference room system used by the plurality of users only displays video from the three most active users in the video conference call, e.g., videos 723', 725', and 727'. In other embodiments, the display of each conference room system used by the plurality of users may display video from the two, four, five, etc. most active users in the video conference call. Similarly, the speakers of each conference room system used by the plurality of users may only play audio from the two, three, four, five, etc. most active users in the video conference call.

The disclosed systems and methods may be implemented on one or more computing devices. Such a computing device may be implemented in various forms including, but not limited to, a client, a server, a network device, a mobile device, a laptop computer, a desktop computer, a workstation computer, a personal digital assistant, a blade server, a mainframe computer, and other types of computers. The computing device described below and its components, including their connections, relationships, and functions, is meant to be an example only, and not meant to limit implementations of the systems and methods described in this specification. Other computing devices suitable for implementing the disclosed systems and methods may have different components, including components with different connections, relationships, and functions.

Figure 8:
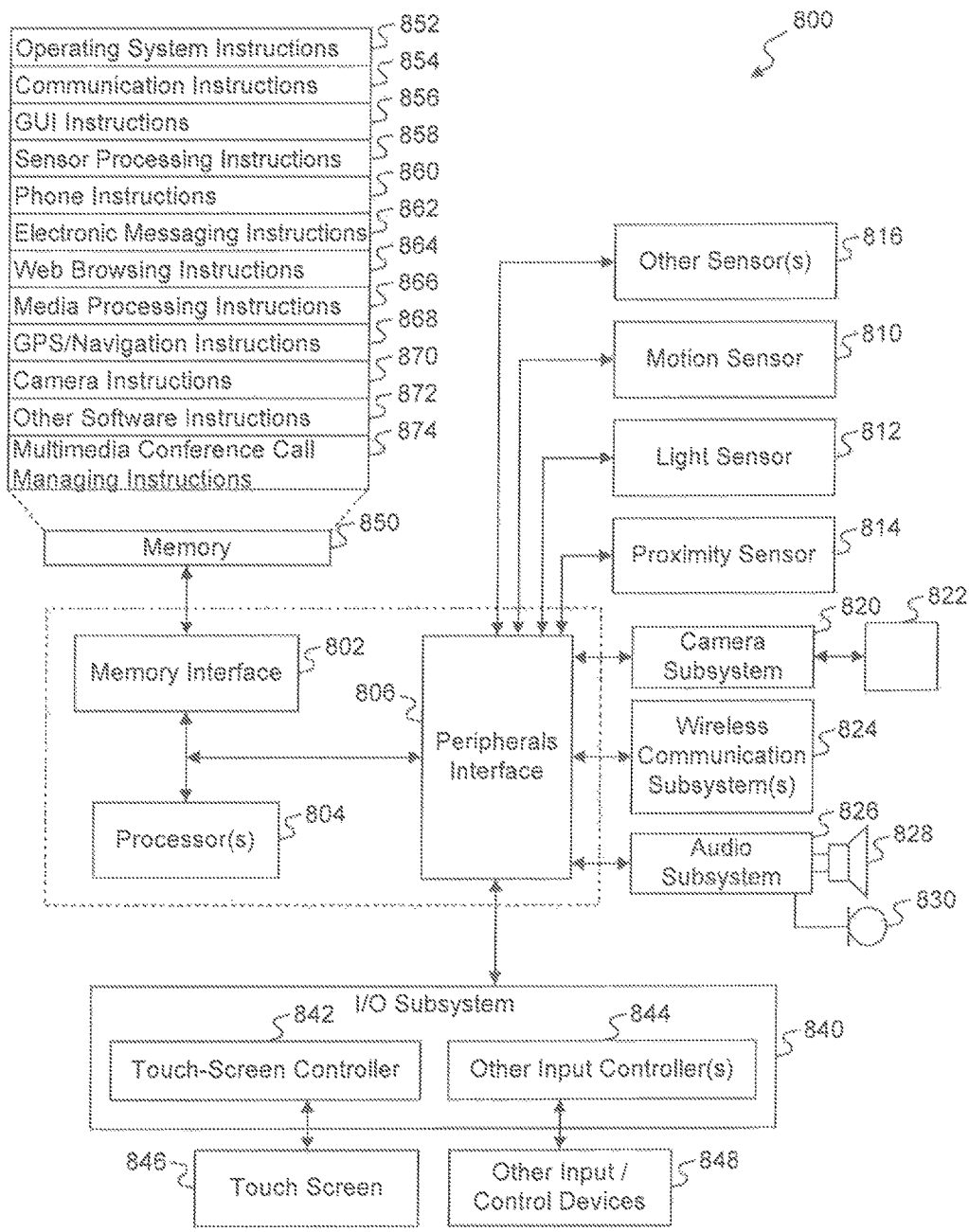
FIG. 8 is a block diagram of an example computing device with which the systems, methods, and apparatuses of the present invention may be implemented.

FIG. 8 is a is a block diagram that illustrates an example of a computing device 800 suitable for implementing the disclosed systems and methods. Device 800 includes a memory interface 802, one or more processors 804, such as data processors, image processors, graphics processing units, and/or central processing units, and a peripherals interface 806. Memory interface 802, one or more processors 804, and/or peripherals interface 806 may comprise separate components or may be integrated in one or more integrated circuits. The various components in device 800 may be coupled by one or more communication buses or signal lines (not shown).

Sensors, devices, and subsystems may be coupled to peripherals interface 806 to facilitate multiple functionalities. For example, a motion sensor 310, a light sensor 812, and a proximity sensor 814 may be coupled to the peripherals interface 806 to facilitate orientation, lighting, and proximity functions. Other sensors 816 may also be connected to peripherals interface 806, such as a global positioning system (e.g., GPS receiver), a temperature sensor, a biometric sensor, or other sensing device, to facilitate related functionalities. A GPS receiver may be integrated with, or connected to, device 800. For example, a GPS receiver may be built into mobile telephones, such as smartphone devices. GPS software allows mobile telephones to use an internal or external GPS receiver (e.g., connecting via a serial port or Bluetooth). A camera subsystem 820 and an optical sensor 822, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 824, which includes an Ethernet port, radio frequency receivers and transmitters, and/or optical (e.g., infrared) receivers and transmitters. The specific design and implementation of wireless/wired communication subsystem 824 depends on the communication network(s) over which device 800 is intended to operate. For example, in some embodiments, device 800 includes wireless/wired communication subsystems 824 designed to operate over a GSM network, a GPRS network, an EDGE network, a Wi-Fi or WiMax network, and a Bluetooth® network. In other embodiments, device 800 includes wireless/wired communication subsystems 824 designed to operate over a TCP/IP network.

An audio subsystem 826 may be coupled to a speaker 828 and a microphone 830 to facilitate voice-enabled functions, such as voice recognition, voice replication, digital recording, and telephony functions.

I/O subsystem 840 includes a touch screen controller 842 and/or other input controller(s) 844. Touch screen controller 842 is coupled to a touch screen 846. Touch screen 846 and touch screen controller 842 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 846. While a touch screen 846 is shown in FIG. 8, I/O subsystem 840 may include a display screen (e.g., CRT or LCD) in place of touch screen 846.

The other input controllers) 844 is coupled to other input/control devices 848, such as one or more buttons, rocker switches, thumb-wheel, infrared port, USB port, and/or a pointer device such as a stylus. Touch screen 846 may, for example, also be used to implement virtual or soft buttons and/or a keyboard.

Memory interface 802 is coupled to memory 850. Memory 850 includes high-speed random access memory and/or non-volatile memory, such as one or more magnetic disk storage devices, one or more optical storage devices, and/or flash memory (e.g., NAND, NOR). Memory 850 stores an operating system 852, such as DRAWIN, RTXC, LINUX, iOS, UNIX, OS X, WINDOWS, or an embedded operating system such as VXWorkS. Operating system 852 may include instructions for handling basic system services and for performing hardware dependent tasks. In some implementations, operating system 852 may comprise a kernel (e.g., UNIX kernel).

Memory 850 may also store communication instructions 854 to facilitate communicating with one or more additional devices, one or more computers and/or one or more servers. Memory 850 may include graphical user interface instructions 855 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/navigation instructions 868 to facilitate GPS and navigation-related processes and instructions; camera instructions 870 to facilitate camera-related processes and functions; and/or other software instructions 872 to facilitate other processes and functions. Memory 850 may also include multimedia conference call managing instructions 874 to facilitate conference call related processes and instructions. Example methods 100, 200, 300, 400, 500, or any combination thereof may be included in conference call managing instructions 874.

In some embodiments, communication instructions 854 may include software applications to facilitate connection with a management server (not shown) that hosts an audio and/or video conference session among a group of participants. In some embodiments, example methods 100, 200, 300, 400, 500, or any combination thereof may be stored and executed on the management server. In other embodiments, example methods 100, 200, 300, 400, 500, or any combination thereof may be stored on the management server and executed remotely on device 800.

Graphical user interface (GUI) instructions 856 may include a software program that facilitates display of the received video from the conference session and facilitates a participant associated with device 800 to provide user input, and so on. Similarly, media processing instructions 868 may include a software program that facilitates playback of the received audio from the conference session and facilitates a participant associated with device 800 to provide user input, and so on.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of device 300 may be implemented in hardware and/or in software, including in one or more signal processing and/or application specific integrated circuits.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for automatically determining the active users in an audio or video conference session, comprising:
   a memory storing instructions; and
   a processor configured to execute the instructions to:

receive packets from a device associated with each of a plurality of users, update a loudest level associated with each user if the received packet from the user reflects a communication louder than all of the previously received packets from the user, calculate a loudness ratio associated with each user based on the loudest level associated with each user and a corresponding time-decaying average, sort the plurality of users by a loudness score associated with each user, wherein the loudness score is based on the loudness ratio associated with each user, and mute audio or hide video received from a subset of the plurality of users in the conference, wherein the muted or hidden subset comprises one or more users for which the associated loudness score is lowest according to the sorting.

2. The system of claim 1, wherein the sorting occurs not more frequently than the frequency at which the audio packets are received.

3. The system of claim 1, wherein one or more users in the plurality of users comprises a plurality of participants.

4. The system of claim 1, wherein the processor is further configured to execute instructions to:

initialize the loudest level associated with each user, wherein the initialization is performed before receiving any audio packets.

5. The system of claim 4, wherein the initialization is random.

6. The system of claim 4, wherein:

each user participates in the conference using at least one microphone and an interface connecting the microphone to the conference, and the initialization is based on at least one of a characteristic of the microphone or a characteristic of the interface.

7. A method for automatically determining the active users in an audio or video conference session, comprising:

receiving packets from a device associated with each of a plurality of users;

updating a loudest level associated with each user if the received packet from the user reflects a communication louder than all of the previously received packets from the user;

calculating a loudness ratio associated with each user based on the loudest level associated with each user and a corresponding time-decaying average;

sorting the plurality of users by a loudness score associated with each user, wherein the loudness score is based on the loudness ratio associated with each user; and muting audio or hiding video received from a subset of the plurality of users in the conference, wherein the muted or hidden subset comprises one or more users for which the associated loudness score is lowest according to the sorting.

8. The method of claim 7, wherein the sorting occurs not more frequently than the frequency at which the audio packets are received.

9. The method of claim 7, wherein one or more users in the plurality of users comprises a plurality of participants.

10. The method of claim 7, further comprising:

initializing the loudest level associated with each user, wherein the initialization is performed before receiving any audio packets.

11. The method of claim 10, wherein the initialization is random.

12. The method of claim 10, wherein:

each user participates in the conference using at least one microphone and an interface connecting the microphone to the conference, and the initialization is based on at least one of a characteristic of the microphone or a characteristic of the interface.

13. A non-transitory computer-readable storage medium storing instructions for automatically determining the active users in an audio or video conference session, the instructions, when executed by one or more processors, causing the one or more processors to perform operations comprising:

receiving packets from a device associated with each of a plurality of users;

updating a loudest level associated with each user if the received packet from the user reflects a communication louder than all of the previously received packets from the user;

calculating a loudness ratio associated with each user based on the loudest level associated with each user and a corresponding time-decaying average;

sorting the plurality of users by a loudness score associated with each user, wherein the loudness score is based on the loudness ratio associated with each user; and muting audio or hiding video received from a subset of the plurality of users in the conference, wherein the muted or hidden subset comprises one or more users for which the associated loudness score is lowest according to the sorting.

14. The medium of claim 13, wherein the sorting occurs not more frequently than the frequency at which the audio packets are received.

15. The medium of claim 13, wherein one or more users in the plurality of users comprises a plurality of participants.

16. The medium of claim 13, wherein the operations further comprise:

initializing the loudest level associated with each user, wherein the initialization is performed before receiving any audio packets.

17. The medium of claim 13, wherein the initialization is random.

18. The medium of claim 13, wherein:

each user participates in the conference using at least one microphone and an interface connecting the microphone to the conference, and the initialization is based on at least one of a characteristic of the microphone or a characteristic of the interface.

* * * * *